(12) United States Patent
Logan

(10) Patent No.: US 8,682,124 B2
(45) Date of Patent: Mar. 25, 2014

(54) ACCESS FEATURES OF ARMORED FLAT FIBER OPTIC CABLE

(75) Inventor: Eric R. Logan, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 120 days.

(21) Appl. No.: 13/445,517

(22) Filed: Apr. 12, 2012

(65) Prior Publication Data

US 2013/0094821 A1 Apr. 18, 2013

(51) Int. Cl.
*G02B 6/44* (2006.01)

(52) U.S. Cl.
USPC ........... 385/100; 385/102; 385/105; 385/107; 385/109; 385/110; 385/113; 385/114

(58) Field of Classification Search
USPC .................................................. 385/100–114
See application file for complete search history.

(56) References Cited

U.S. PATENT DOCUMENTS

| | | |
|---|---|---|
| 3,076,235 A | 2/1963 | Rollins et al. |
| 3,991,014 A | 11/1976 | Kleinschuster ................ 260/47 |
| 4,067,852 A | 1/1978 | Calundann ..................... 260/47 |
| 4,083,829 A | 4/1978 | Calundann et al. ............ 260/47 |
| 4,130,545 A | 12/1978 | Calundann ................... 260/40 P |
| 4,237,337 A | 12/1980 | Serrander .................... 174/70 R |
| 4,248,824 A | 2/1981 | Hattop ........................... 264/171 |
| 4,318,842 A | 3/1982 | East et al. ...................... 524/605 |
| 4,456,331 A | 6/1984 | Whitehead et al. ......... 350/96.23 |
| 4,468,364 A | 8/1984 | Ide ............................. 264/176 R |
| 4,707,074 A | 11/1987 | Heywood ................... 350/96.23 |
| 4,729,628 A | 3/1988 | Kraft et al. ................. 350/96.23 |
| 4,848,868 A | 7/1989 | Rohner ....................... 350/96.23 |
| 5,218,659 A | 6/1993 | Schneider ...................... 385/110 |
| 5,360,497 A | 11/1994 | Schneider et al. .............. 156/47 |
| 5,442,722 A | 8/1995 | DeCarlo ........................ 385/114 |
| 5,636,308 A | 6/1997 | Personne et al. .............. 385/102 |
| 5,651,081 A * | 7/1997 | Blew et al. ..................... 385/101 |

(Continued)

FOREIGN PATENT DOCUMENTS

| | | | | |
|---|---|---|---|---|
| DE | 4421456 A1 | 12/1995 | ............. | B29C 47/02 |
| EP | 647866 A1 | 4/1995 | ............... | G02B 6/44 |

(Continued)

OTHER PUBLICATIONS

U.S. Appl. No. 13/489,901, filed Jun. 6, 2012, Michael J. Gimblet, 23 pages.

(Continued)

*Primary Examiner* — Ryan Lepisto
(74) *Attorney, Agent, or Firm* — Russell S. Magaziner

(57) ABSTRACT

A fiber optic cable includes a jacket, strength members, armor, and a tear feature. The jacket is formed from a first polymeric material and defines an exterior of the cable. The jacket further forms an interior cavity configured to support an optical fiber. The strength members are each surrounded by the jacket, with the cavity separating the strength members from one another. The armor extends above the cavity and at least partially above the strength members, and has greater tensile strength than the first polymeric material. The tear feature is located beneath the armor and is formed from a second polymeric material co-extrudable with the first polymeric material. The tear feature forms a discontinuity of material within the jacket. At least one of the second polymeric material and the interface between the first and second polymeric materials yields at a lesser tearing force than the first polymeric material.

16 Claims, 6 Drawing Sheets

(56) References Cited

U.S. PATENT DOCUMENTS

| | | | |
|---|---|---|---|
| 5,717,805 A | 2/1998 | Stulpin | 385/114 |
| 5,737,470 A | 4/1998 | Nagano et al. | 385/114 |
| 5,740,295 A * | 4/1998 | Kinard et al. | 385/109 |
| 5,970,196 A * | 10/1999 | Greveling et al. | 385/114 |
| 5,987,204 A | 11/1999 | Lee et al. | 385/100 |
| 6,041,153 A | 3/2000 | Yang | 385/109 |
| 6,088,499 A | 7/2000 | Newton et al. | 385/112 |
| 6,101,305 A * | 8/2000 | Wagman et al. | 385/113 |
| 6,137,936 A | 10/2000 | Fitz et al. | 385/113 |
| 6,167,180 A | 12/2000 | Keller | 385/113 |
| 6,222,969 B1 | 4/2001 | Botelho et al. | 385/114 |
| 6,311,000 B1 | 10/2001 | Schneider | 385/113 |
| 6,351,589 B1 | 2/2002 | Leggett | 385/128 |
| 6,404,962 B1 | 6/2002 | Hardwick, III et al. | 385/114 |
| 6,507,686 B1 * | 1/2003 | Heinz et al. | 385/100 |
| 6,519,396 B2 | 2/2003 | Schneider et al. | 385/101 |
| 6,542,674 B1 * | 4/2003 | Gimblet | 385/113 |
| 6,545,222 B2 | 4/2003 | Yokokawa et al. | 174/110 R |
| 6,546,176 B2 | 4/2003 | Anderson et al. | 385/113 |
| 6,563,991 B1 | 5/2003 | Witt et al. | 385/107 |
| 6,603,908 B2 | 8/2003 | Dallas et al. | 385/109 |
| 6,661,956 B2 | 12/2003 | Yamasaki et al. | 385/109 |
| 6,704,481 B2 | 3/2004 | Gaillard et al. | 385/113 |
| 6,728,455 B2 | 4/2004 | Kusakari et al. | 385/113 |
| 6,760,522 B2 | 7/2004 | Okada et al. | 385/109 |
| 6,766,091 B2 | 7/2004 | Beuth et al. | 385/128 |
| 6,813,421 B2 | 11/2004 | Lail et al. | 385/101 |
| 6,876,798 B2 | 4/2005 | Triplett et al. | 385/100 |
| 6,957,000 B2 | 10/2005 | McAlpine et al. | 385/102 |
| 6,970,629 B2 | 11/2005 | Lail et al. | 385/100 |
| 7,029,137 B2 | 4/2006 | Lionetti et al. | 362/84 |
| 7,050,685 B2 | 5/2006 | Plemmons et al. | 385/109 |
| 7,085,459 B2 | 8/2006 | Conrad et al. | 385/114 |
| 7,116,872 B2 | 10/2006 | Okuno et al. | 385/114 |
| 7,123,801 B2 | 10/2006 | Fitz | 385/105 |
| 7,136,556 B2 | 11/2006 | Brown et al. | 385/100 |
| 7,177,507 B2 | 2/2007 | Parsons et al. | 385/100 |
| 7,187,830 B2 | 3/2007 | Blazer | 385/114 |
| 7,197,215 B2 | 3/2007 | Baird et al. | 385/113 |
| 7,218,821 B2 | 5/2007 | Bocanegra et al. | 385/103 |
| 7,225,534 B2 | 6/2007 | Kachmar | 29/825 |
| 7,231,119 B2 | 6/2007 | Rhoney et al. | 385/100 |
| 7,236,670 B2 | 6/2007 | Lail et al. | 385/100 |
| 7,251,411 B1 | 7/2007 | Lu et al. | 385/147 |
| 7,254,302 B2 | 8/2007 | Parsons et al. | 385/100 |
| 7,277,615 B2 * | 10/2007 | Greenwood et al. | 385/100 |
| 7,336,873 B2 | 2/2008 | Lail et al. | 385/100 |
| 7,346,244 B2 | 3/2008 | Gowan et al. | 385/113 |
| 7,379,642 B2 | 5/2008 | Kachmar | 385/102 |
| 7,391,943 B2 * | 6/2008 | Blazer et al. | 385/100 |
| 7,400,810 B2 | 7/2008 | Tanaka et al. | 385/134 |
| 7,403,685 B2 | 7/2008 | Wells | 385/100 |
| 7,415,181 B2 | 8/2008 | Greenwood et al. | 385/100 |
| 7,424,189 B2 | 9/2008 | Lu et al. | 385/100 |
| 7,469,087 B2 | 12/2008 | Parsons et al. | 385/100 |
| 7,471,862 B2 | 12/2008 | Bringuier et al. | 385/113 |
| 7,480,436 B2 | 1/2009 | Wells et al. | 385/134 |
| 7,489,843 B2 | 2/2009 | Carlson et al. | 385/100 |
| 7,532,796 B2 | 5/2009 | Chiasson | 385/114 |
| 7,539,380 B1 | 5/2009 | Abernathy et al. | 385/100 |
| 7,567,741 B2 | 7/2009 | Abernathy et al. | 385/113 |
| 7,587,111 B2 | 9/2009 | de Montmorillon et al. | 385/127 |
| 7,590,321 B2 | 9/2009 | Lu et al. | 385/104 |
| 7,603,012 B1 | 10/2009 | Ice | 385/103 |
| 7,623,747 B2 | 11/2009 | De Montmorillon et al. | 385/124 |
| 7,693,375 B2 | 4/2010 | Freeland et al. | 385/100 |
| 7,747,117 B2 | 6/2010 | Greenwood et al. | 385/100 |
| 7,751,666 B2 | 7/2010 | Parsons et al. | 385/100 |
| 7,787,727 B2 * | 8/2010 | Bringuier et al. | 385/113 |
| 7,796,853 B2 | 9/2010 | Abernathy et al. | 385/100 |
| 7,817,891 B2 | 10/2010 | Lavenne et al. | 385/109 |
| 2003/0068146 A1 * | 4/2003 | Nechitailo et al. | 385/103 |
| 2003/0118295 A1 | 6/2003 | Lail et al. | 385/101 |
| 2005/0213899 A1 * | 9/2005 | Hurley et al. | 385/100 |
| 2006/0045443 A1 | 3/2006 | Blazer | 385/114 |
| 2006/0127016 A1 * | 6/2006 | Baird et al. | 385/113 |
| 2006/0291787 A1 | 12/2006 | Seddon | 385/113 |
| 2008/0013899 A1 | 1/2008 | Gowan et al. | 385/113 |
| 2008/0193092 A1 | 8/2008 | Greenwood et al. | 385/113 |
| 2009/0087148 A1 | 4/2009 | Bradley et al. | 385/76 |
| 2009/0274425 A1 | 11/2009 | Caldwell et al. | 385/102 |
| 2009/0274426 A1 | 11/2009 | Lail | 385/105 |
| 2009/0317039 A1 | 12/2009 | Blazer et al. | 385/107 |
| 2009/0324182 A1 | 12/2009 | Kachmar et al. | 385/104 |
| 2010/0132973 A1 | 6/2010 | Fitz et al. | 174/102 R |
| 2011/0217010 A1 | 9/2011 | Kachmar | 385/111 |
| 2011/0229098 A1 | 9/2011 | Abernathy et al. | 385/102 |

FOREIGN PATENT DOCUMENTS

| | | | |
|---|---|---|---|
| EP | 749129 A1 | 12/1996 | H01B 7/00 |
| EP | 1168024 B1 | 6/2006 | G02B 6/44 |
| EP | 1376156 B1 | 7/2006 | G02B 1/04 |
| JP | 60-91306 A | 5/1985 | G02B 6/24 |
| JP | 63-120206 U | 8/1988 | G02B 6/08 |
| JP | 9-230184 A | 9/1997 | G02B 6/44 |
| JP | 2005-148373 A | 6/2005 | G02B 6/44 |
| JP | 2005-345622 A | 12/2005 | G02B 6/44 |
| JP | 2006-162703 A | 6/2006 | G02B 6/44 |
| JP | 2006-171570 A | 6/2006 | G02B 6/44 |
| JP | 2006-251769 A | 9/2006 | G02B 6/44 |
| JP | 2006-251770 A | 9/2006 | G02B 6/44 |
| JP | 2006-267600 A | 10/2006 | G02B 6/44 |
| JP | 2007-272006 A | 10/2007 | G02B 6/44 |
| JP | 2009-37150 A | 2/2009 | G02B 6/44 |
| JP | 2009-258153 A | 11/2009 | G02B 6/44 |
| KR | 2006-0081266 | 7/2006 | G02B 6/44 |
| KR | 2006-0107414 | 10/2006 | G02B 6/02 |
| WO | 03/046074 A1 | 6/2003 | C08L 23/16 |
| WO | 2004/021367 A2 | 3/2004 | H01B 7/00 |
| WO | 2005/096053 A1 | 10/2005 | G02B 6/44 |
| WO | 2006/097540 A1 | 9/2006 | G02B 6/44 |
| WO | 2011/109498 A2 | 9/2011 | |
| WO | 2011/137236 A1 | 11/2011 | B29C 47/02 |
| WO | WO 2011/137236 A1 | 11/2011 | G02B 6/44 |
| WO | 2012/058181 A1 | 5/2012 | G02B 6/44 |
| WO | 2012/071490 A2 | 5/2012 | B29C 47/02 |

OTHER PUBLICATIONS

U.S. Appl. No. 13/560,374, filed Jul. 27, 2012, Michael John Gimblet, 24 pages.

U.S. Appl. No. 13/646,962, filed Oct. 8, 2012, Anne Germaine Bringuier, 26 pages.

U.S. Appl. No. 13/658,404, filed Oct. 23, 2012, Michael John Gimblet, 21 pages.

U.S. Appl. No. 13/658,431, filed Oct. 23, 2012, Samuel Don Nave, 19 pages.

Nippon Telegraph and Telephone Corporation, Specification for Aerial SM Optical Fiber Cable, Spec. No. 520292, 4th Version, Jul. 29, 2002, 56 pages.

Renka Corporation, Single Mode Optical Fiber Cable, Specification No: RENKA/OFC/SM-DI/AR, Dec. 2000, 13 pages.

PCT IPRP for Publication WO2011137236, Nov. 6, 2011, 10 pages.

PCT ISR for Publication WO2011137236, Aug. 9, 2011, 6 pages.

PCT ISR for Publication WO2012058181, Feb. 23, 2012, 4 pages.

PCT ISR for Publication WO2012071490, Sep. 12, 2012, 7 pages.

* cited by examiner

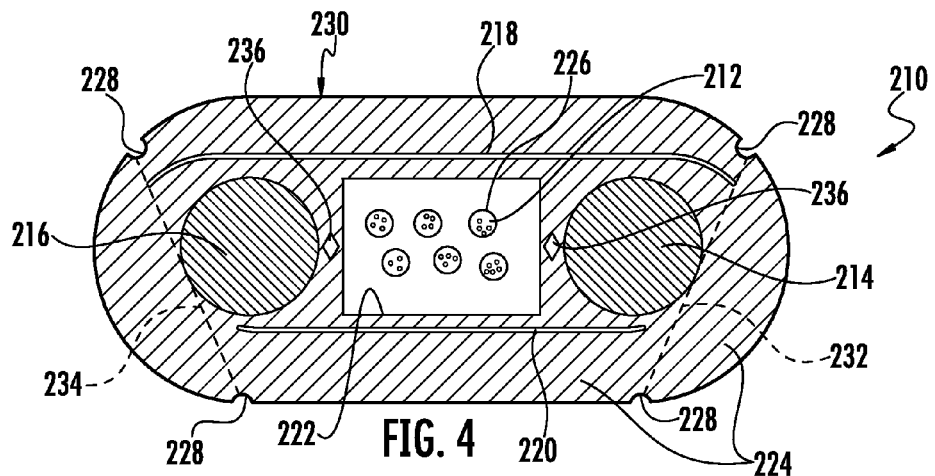
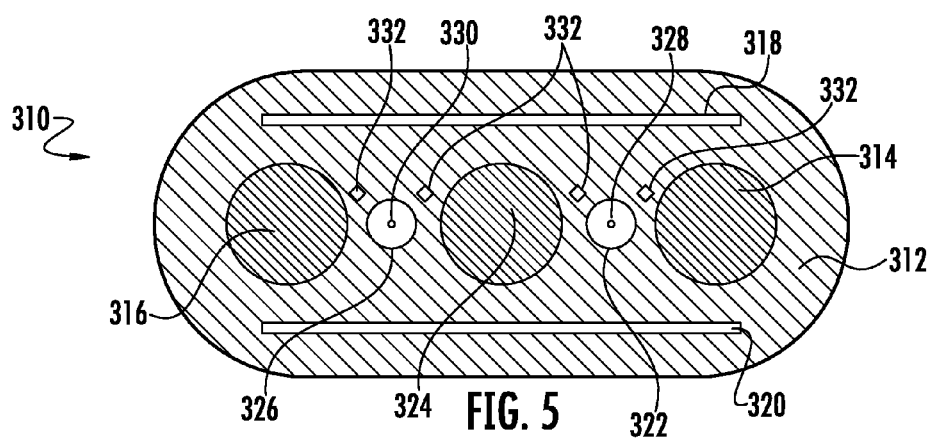
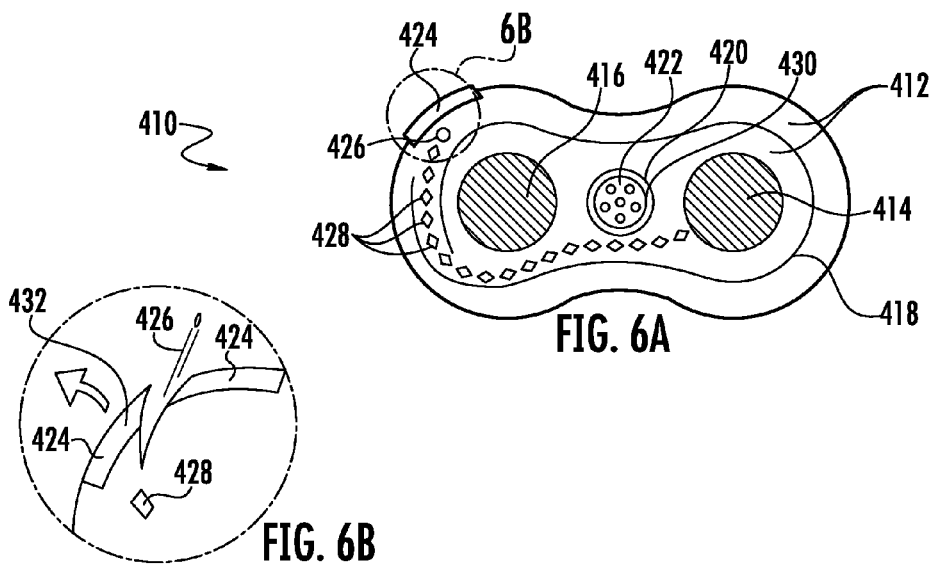

ACCESS FEATURES OF ARMORED FLAT FIBER OPTIC CABLE

RELATED APPLICATIONS

This Application is related to U.S. application Ser. No. 12/843,402, filed Jul. 26, 2010; U.S. Provisional Application No. 61/546,694, filed Oct. 13, 2011; and U.S. Provisional Application No. 61/597,917, filed Feb. 13, 2012, each of which is incorporated by reference herein in its entirety.

BACKGROUND

Aspects of the present disclosure relate generally to access features of armored fiber optic cable, such as flat cable. The access features may facilitate opening a jacket of the fiber optic cable to access optical fibers in a cavity of the fiber optic cable.

So-called "flat" fiber optic cables typically include an oblong cross-section with two longer sides on the top and bottom, and two shorter sides extending therebetween. The shorter sides are often rounded and the longer sides are generally flat. In some cases, such as due to manufacturer molding techniques and design choices, a flat cable may have somewhat rounded longer sides, or the longer sides may include a dip or a waving surface. The shorter sides may be flat. The flat cable cross-section may actually be oval or elliptical.

Interior to the flat fiber optic cable, typically two strength members, such as glass-reinforced plastic rods, extend in parallel with one another along the length of the cable. Between the two strength members, the fiber optic cable includes optical fiber(s), such as multiple fibers connected together as a ribbon or stacks of ribbons. RPX® Gel-Free Ribbon Cable, manufactured by CORNING CABLE SYSTEMS LLC is an example of one type of flat fiber optic cable.

The optical fibers of flat fiber optic cables may be accessed by shaving or cutting into a top portion of the jacket. In some cases, the strength members may be sized to facilitate controlled shaving and removal of the top of the jacket by providing a limit to the depth of the shave. Once cut into, the top of the jacket may be removed and the optical fibers may be pulled through the opening, such as for splicing to a tether cable or for other reasons.

Flat fiber optic cable may be armored. However, in practice, the armor may make accessing the optical fibers cumbersome. Top-down access may be blocked by the armor and walls of the cavity, between the strength members and the cavity, may be hard to access and then difficult to penetrate. It may also be difficult or time-consuming for a field technician to get under or separate the armor from the jacket.

In some cases, multiple tools or specialized tooling as well as complex operating procedures may be required to gain access to optical fibers of an armored flat fiber optic cable. In other cases, rip cords may be located between the armor and the cavity. But such rip cords may not be deep enough within the cable (due to the armor being in the way) to sufficiently cut into the cavity, and such cables may still require penetration of large thickness of jacket material with tooling to access the optical fibers. As such, a need exists to improve accessibility of optical fibers of flat fiber optic cables that are armored.

SUMMARY

One embodiment relates to a fiber optic cable, which includes a jacket, first and second strength members, armor, and a tear feature. The jacket is primarily formed from a first polymeric material and has an outer surface defining an exterior of the fiber optic cable. The exterior of the fiber optic cable has an oblong-shaped periphery with two opposing longer sides and two opposing shorter sides. The jacket further forms lateral walls of an interior cavity extending lengthwise through the fiber optic cable, where the cavity is configured to support an optical fiber. The first and second strength members are each surrounded laterally by the jacket such that the lateral walls of the cavity, and the cavity itself, separate the first and second strength members from one another. The armor extends lengthwise along the fiber optic cable above the cavity and at least partially above the first and second strength members. The armor has greater tensile strength than the first polymeric material and accordingly forms a barrier limiting inadvertent penetration of the jacket. The tear feature is located interior to the exterior of the fiber optic cable and beneath the armor. Additionally, the tear feature is formed from a second polymeric material that is co-extrudable with the first polymeric material, where the tear feature is integrated into the jacket such that the tear feature forms a discontinuity of material within the jacket. At least one of the second polymeric material and the interface between the first and second polymeric materials yields at a lesser tearing force than the first polymeric material, such that the tear feature facilitates opening the jacket around the armor to access the cavity by way of tearing through the jacket via the tear feature.

Another embodiment relates to a similar fiber optic cable that includes first and second tear features. The first tear feature is located interior to the exterior of the fiber optic cable and beneath the armor. The second tear feature is located closer to the exterior than the first tear feature. The first and second tear features are formed from the second polymeric material, which is co-extrudable with the first polymeric material, and the first and second tear features are integrated into the jacket such that the first and second tear features both form discontinuities of material within the jacket. At least one of the second polymeric material and the interface between the first and second polymeric materials yields at a lesser tearing force than the first polymeric material, such that the tear features facilitate opening the jacket around the armor to access the cavity by way of tearing through the jacket via the tear features.

Yet another embodiment relates to a method of manufacturing a fiber optic cable. The method includes steps of extruding a first jacketing material around strength members, over armor, and to form a cavity between the strength members and beneath the armor. The cavity is configured to support an optical fiber. The method further includes a step of co-extruding a second jacketing material with the first jacketing material to form a discontinuity of material. The discontinuity of material is interior to the exterior surface of the fiber optic cable.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which:

FIGS. 4-6A are sectional views of fiber optic cables according to other exemplary embodiments.

FIG. 6B is an expanded view of a portion of the fiber optic cable of FIG. 6A taken along line 6B-6B as shown in FIG. 6A after a rip cord has been accessed and pulled.

DETAILED DESCRIPTION

Before turning to the following Detailed Description and Figures, which illustrate exemplary embodiments in detail, it should be understood that the present invention is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1:
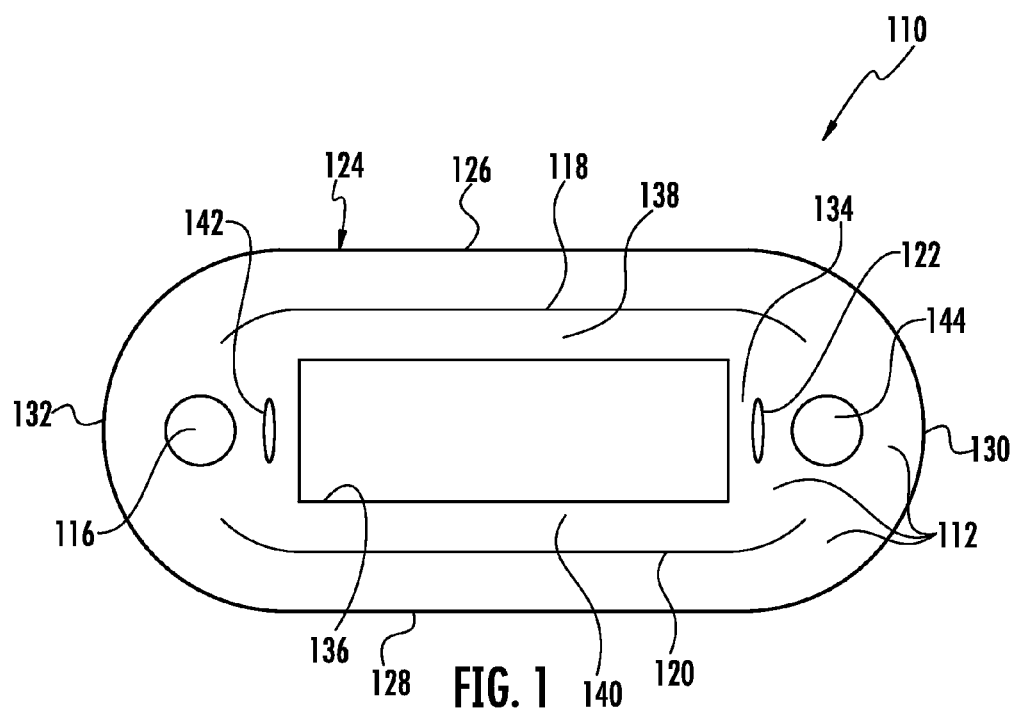
FIG. 1 is a sectional view of a fiber optic cable according to an exemplary embodiment.

Referring to FIG. 1, a fiber optic cable 110 includes a jacket 112, first and second strength members 114, 116, armor 118, 120, and an access feature in the form of a tear feature 122 (e.g., discontinuity of material, weakened section). The jacket 112 is primarily formed from a first polymeric material and has an outer surface defining an exterior 124 of the fiber optic cable 110. According to an exemplary embodiment, the fiber optic cable 110 is a "flat" cable, where the exterior 124 of the fiber optic cable 110 has an oblong-shaped periphery with two opposing longer sides 126, 128 and two opposing shorter sides 130, 132. In contemplated embodiments, a skin layer (e.g., nylon) or other cable components may be positioned outside of the jacket exterior.

In the interior of the fiber optic cable 110, the jacket 112 further forms lateral walls 134 (e.g., webs) of a cavity 136 extending lengthwise through the fiber optic cable 110. The cavity 136 is configured to support an optical fiber (see, e.g., optical fibers 212 of fiber optic cable 210 as shown in FIG. 4); and in some embodiments the cavity 136 is actively supporting the optical fiber (FIG. 4), while in other embodiments the cavity 136 may be unoccupied by optical fibers (FIG. 1), such as with an empty furcation tube or tether sleeve. Also in the interior of the fiber optic cable 110, the first and second strength members 114, 116 are each laterally surrounded by the jacket 112 (e.g., embedded in) such that the lateral walls 134 of the cavity 136, and the cavity 136 itself, separate the first and second strength members 114, 116 from one another.

In some embodiments, the strength members 114, 116 are each discrete structures, such as rods or stranded wires, as opposed to loose tensile fibers. The strength members 114, 116 may be formed from glass-reinforced plastic, steel (e.g., stranded or otherwise), or another material. In other embodiments, loose-, stranded-, or woven-tensile fibers are used as strength members, such as aramid or fiberglass fibers. The strength members 114, 116 may serve to increase the tensile strength of the fiber optic cable 110. Some contemplated strength members 114, 116 (e.g., glass-reinforced plastic rods) may also increase resistance of the cable 110 to buckling.

In still other contemplated embodiments, the armor 118, 120 provides sufficient tensile and compressive strength to the cable 110, such that the strength members 114, 116 mainly serve to provide crush resistance or are not included. In some such contemplated embodiments, the strength members 114, 116 are discrete pillars, and may not be continuous along the length of the fiber optic cable 110 (orthogonal to the cross-section shown in FIG. 1).

According to an exemplary embodiment, the armor 118, 120 extends lengthwise along the fiber optic cable 110 above the cavity 136 and at least partially above the first and second strength members 114, 116. In some embodiments, the jacket 112 further forms top and bottom walls of the cavity. While in other embodiments, the armor forms the top and/or bottom walls of the cavity 138, 140. In some embodiments the armor 118, 120 is flat and may only extend above or along the top or bottom walls of the cavity 138, 140. In other embodiments, armor 118, 120 may extends along the lateral sides 134 of the cavity 136, such as curving up or down at least partially around the lateral sides 134 of the cavity 136 and/or the laterally-outside portions of the strength members 114, 116.

According to an exemplary embodiment, the armor 118, 120 has greater tensile strength (e.g., yield and ultimate strength) than the first polymeric material of the jacket 112, and accordingly forms a barrier limiting inadvertent penetration of the jacket. According to an exemplary embodiment, the armor includes (e.g., consists of) corrugated steel sheets above and below the cavity. In other embodiments, the armor includes wire mesh (e.g., steel); or a mesh or arrangement of other armor material, such as woven, continuous-composite fiber (e.g., Kevlar or fiber glass) in a cured-resin matrix, where the armor 118, 120 may be dielectric. For example, the armor may be or include a layer of aramid or fiber glass yarns embedded in the top and bottom lobes of the jacket fits. In other instances, the armor may be or include primarily a metallic layer. In some embodiments, the armor 118, 120 is relatively flexible and does not contribute significantly to the rigidity of the fiber optic cable 110 (e.g., adding less than 25% rigidity (i.e., stiffness) to bending about the widthwise axis of the cable 110, when compared to similar cables without armor 118, 120).

Still referring to FIG. 1, the tear feature 122 is located interior to the exterior 124 of the fiber optic cable 110, such that the tear feature 122 is completely embedded within the jacket 112 or does not extend to the exterior surface of the jacket 112. Furthermore, the tear feature 122 is located beneath the armor 118, such as at least partially between two opposing sheets of the armor 118, 120 on opposite sides of the cavity 136. In some embodiments the tear feature 122 is fully or completely beneath the armor 118, while in other embodiments only a portion of the tear 122 feature is beneath the armor 118. Locating the tear feature 122 beneath the armor 118 may help the operator to penetrate and access the cavity 136 on the underside of the armor 118.

According to an exemplary embodiment, the tear feature 122 is positioned at the mid-point of the lateral wall 134 between the strength member 114 and the cavity 136. In some such embodiments, such as where the strength member 114 is round in cross section, the tear feature 122 is aligned with the narrowest portion of the lateral wall 134 of the cavity 136. In some embodiments, the tear feature 122 extends partially or fully through one of the lateral walls 134 of the cavity 136. In some embodiments, the tear feature 122 is located in the jacket 112 such that the tear feature 122 has the cavity 136 on one side, one of the first and second strength members 114, 116 on another side, and the armor 118, 120 on a third side (and fourth side).

According to an exemplary embodiment, the tear feature 122 is a first tear feature 122 and the fiber optic cable 110 further includes one or more additional tear features, such as a second tear feature 142 located on the opposite side of the cavity 136 to the first tear feature 122. The first and second tear features 122, 142 together facilitate complete separation of the cavity 136 into two parts (see, e.g., FIG. 3). In embodiments without one of the tear features 122, 142, the cavity 136 may only be partially opened by tearing, but the other side may remain whole and facilitate closure of the cable 110 when access to the optical fibers is no longer needed.

According to an exemplary embodiment, the tear feature 122 is formed from a second polymeric material that is co-extrudable with the first polymeric material, such that both materials may be extruded; both may be extruded via the same cross-head; and/or both materials may be extruded within a similar temperature range (e.g., may be extruded at temperatures that are within 500° C. of one another). International Application PCT/US11/57574, filed Oct. 25, 2011, and International Application PCT/US11/62002, filed Nov. 23, 2011, the disclosures of which are both incorporated by reference herein in their entireties, disclose co-extrusion techniques and equipment for extruding access features for fiber optic cables.

For example, the first polymeric material may primarily be polyethylene (e.g., greater than 50% polyethylene by weight) and the second polymeric material may primarily be polypropylene. In addition to polyethylene, the first polymeric material may include ultra-violet light blockers (e.g., carbon black), adhesion promoters (e.g., polyolefin plastomers), tackifiers (e.g., polyisobutene), and/or other components. In some embodiments, the second polymeric material includes a lesser amount (by weight) of polyethylene mixed with the polypropylene, which may improve adhesion between the first and second polymeric materials at the interface therebetween.

In other contemplated embodiments, the first polymeric material may be plastics or polymers other than polyethylene, such as primarily polyvinyl chloride, polyurethane, polybutylene terephthalate, polyamide, a low-smoke zero-halogen polymer, or other materials or combination of these and other materials. The second polymeric material may be plastics or polymers other than polypropylene, such as nylon, polyvinyl chloride, or other materials.

According to an exemplary embodiment, the tear feature 122 is integrated into the jacket 112 such that the tear feature 122 forms a discontinuity of material within the jacket 112. As such, the jacket 112 forms a continuous solid structure, but includes the discontinuity of material (i.e., tear feature 122) within that solid structure.

According to an exemplary embodiment, at least one of (1) the second polymeric material of the tear feature 122 and (2) the interface, between the first and second polymeric materials along the periphery of the tear feature 122, yields (e.g., tears, fails, separates) at a lesser tearing force (e.g., shear) than required for the first polymeric material to separate from itself. According to an exemplary embodiment, the second polymeric material or the interface between the first and second polymeric materials separates at an applied shear stress that is less than the shear stress required to tear the first polymeric material, such as a shear stress that is 70% or less, or 50% or less. As such, the tear feature 122 facilitates opening the jacket 112 around the armor 118, 120 to access the cavity 136 by serving as a guide for tearing through the jacket 112.

Co-extruding the second polymeric material into the first polymeric material may form a solid jacket 112 structure between the two polymeric materials, which may provide increased crush performance relative to other types of discontinuities (e.g., air pocket, rip cord). Furthermore, in some embodiments the interface (e.g., contact, connection) between the first and second polymeric materials may adhere and serve to prevent water penetration between the first and second polymeric materials, along the path of the tear feature. In contemplated embodiments, other types of discontinuities may be integrated with the fiber optic cable, alone or in addition to the tear feature 122, to facilitate improved accessibility of the optical fibers around the armor 118, 120 of the flat cable 110.

According to an exemplary embodiment, the second polymeric material is dyed a different color than the first polymeric material. Dying the second polymeric material a different color than the first polymeric material may accentuate the presence of the tear feature 112, so as to identify to a user viewing an end cross-section of the cable that the tear feature 122 is present and provides an easy path to accessing the optical fibers. In some embodiments, the second polymeric material is dyed a color that contrasts with the color of the first polymeric material, such as bright yellow versus black, or light blue versus black.

In some such embodiments, the difference in colors between the first and second polymeric materials is at least two in the parameter of lightness (or "value") on the Munsell scale, at least two in the parameter of hue on the Munsell scale, and/or at least two in the parameter of chroma on the Munsell scale (or at least three, at least four, at least five for the three Munsell scale components). In contemplated embodiment, this technique of using differently-colored first and second polymeric materials with jackets 112 having tear features 122 (e.g., material discontinuities) to improve ease of access to optical fibers may be used in fiber optic cables that do not include armor, and/or in fiber optic cables that are not flat cables (e.g., round fiber optic cables containing various arrangements and types of optical fibers).

The tear feature 122 may have a cross-section with any of a wide variety of shapes, including geometric shapes, such as circles, diamonds, bars, stars, and rectangles. In some embodiments, the tear feature 122 has a geometric discontinuity in the transverse cross-section of the tear feature 122, such as a sharp point or corner, which may provide a stress concentration to facilitate tearing of the surrounding jacket 112 of the first polymeric material. In some embodiments, the tear feature 122 is generally diamond-shaped, having pointed ends along a longer axis, where the geometric discontinuity is a vertex of the diamond (e.g., one of the pointed ends along the longer axis).

According to an exemplary embodiment, the size of the tear feature 122 is small relative to the jacket 112. In some such embodiments, the volume of the tear feature 122 is less than a tenth, less than a twentieth, less than a fiftieth, or even less than a hundredth of the volume of the rest of the jacket 112 (including other tear features 142 and connected internal structures (e.g., cavity walls 134)). The exterior 124 and interior-most surfaces of the jacket 112 (and/or interior layers aligned therewith) may be entirely formed from (e.g., consist of) the first polymeric material, providing jacket 112 with properties (e.g., porosity, surface friction coefficient, color) that are generally associated with the first polymeric material.

Still referring to FIG. 1, a method of manufacturing the fiber optic cable 110 includes extruding a first jacketing material (e.g., first polymeric material) around strength members 114, 116, so as to embed or encapsulate the strength members 114, 116. The method further includes extruding the first jacketing material over the armor 118, 120. The step of extruding over the armor 118, 120 may occur simultaneously with the step of extruding around the strength members 114, 116, or may occur during a second pass down an extrusion line or with a second extruder. The method further includes extruding the first jacketing material to form the cavity 136 between the strength members 114, 116 and beneath the armor 118 (and between the armor 118, 120), where the cavity 136 is configured to support an optical fiber.

Additionally, the method of manufacturing the fiber optic cable 110 includes extruding a second jacketing material (e.g., second polymeric material). The second jacketing material may be co-extruded with the first jacketing material to form the discontinuity of material (i.e., tear feature 122), where the discontinuity of material is interior to the exterior 124 of the fiber optic cable 110. Alternatively, the second jacketing material may be extruded over the first jacketing material, and a second pass of the first jacketing material may then be extruded over the second jacketing material to embed the second jacketing material within the first jacketing material.

According to an exemplary embodiment, the second jacketing material forms a discontinuity of material that is beneath the armor 118, as discussed above. In some embodiments, the discontinuity of material is between one of the strength members 114, 116 and the cavity 136. A step of mixing the first jacketing material and another material, such as a polymer, to form the second jacketing material may improve adhesion between the first and second jacketing materials and correspondingly reduce the ability for water penetration along the interface between the first and second jacketing materials around the tear feature 122.

Figure 2:
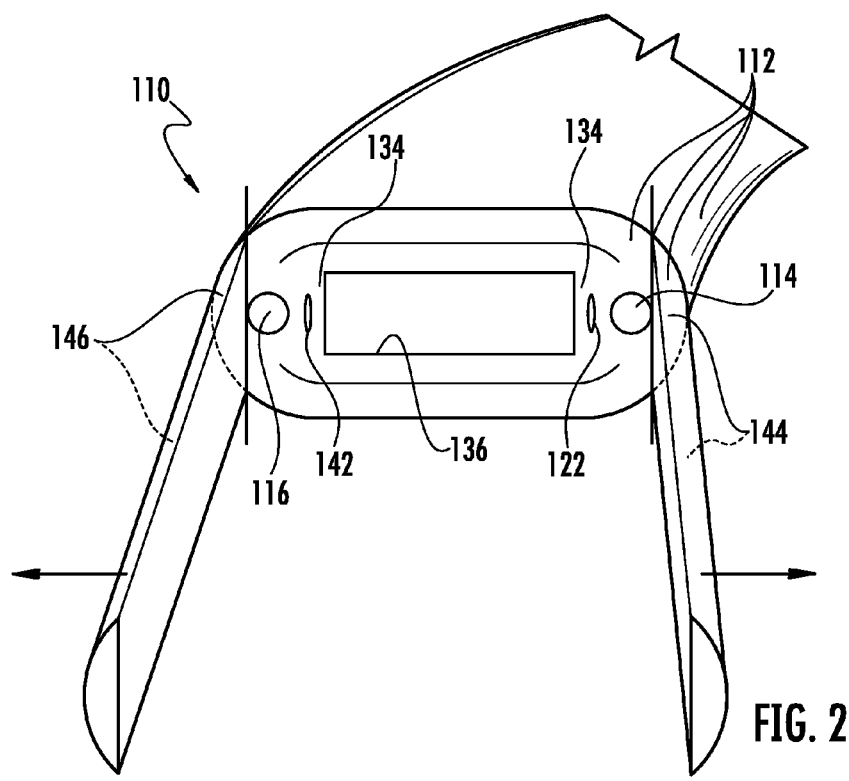
FIG. 2 is a conceptual diagram showing a step for accessing the cavity of the fiber optic cable of FIG. 1 by removing side portions of the jacket.
Figure 3:
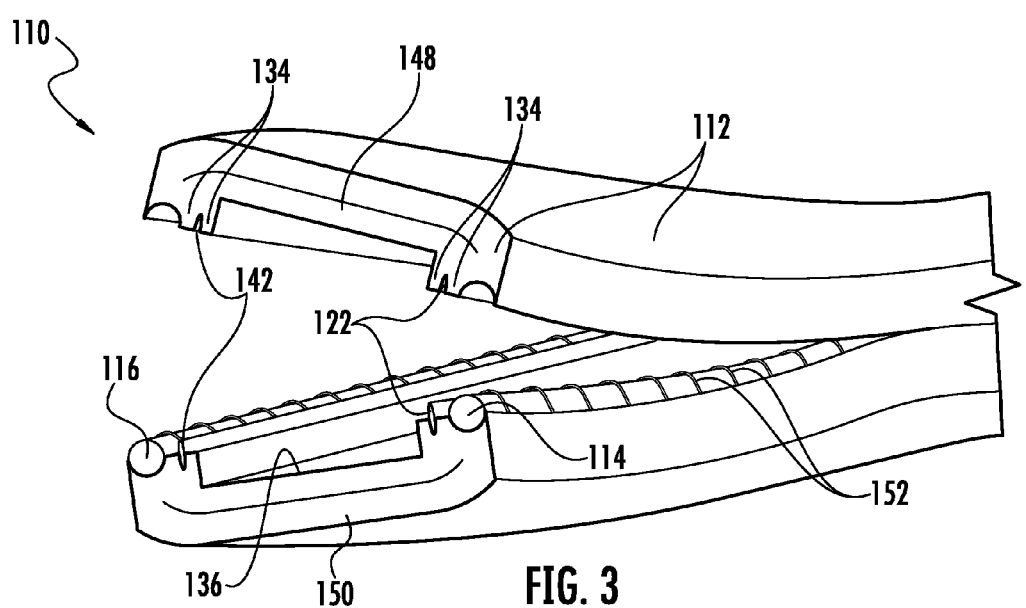
FIG. 3 is a conceptual diagram showing another step for accessing the cavity of the fiber optic cable of FIG. 1 by tearing apart top and bottom portions of the jacket.

Referring now to FIGS. 2-3, a method of opening the fiber optic cable 110 to access optical fibers in the cavity 136 includes removing side portions 144, 146 of the jacket 112 up to the strength members 114, 116. The side portions 144, 146 may be shaved (e.g., cut, sliced), as shown in FIG. 2, such as with a razor or another tool. Following removal of the side portions 144, 146, the lateral walls 134 of the cavity 136 and the bonding between the strength members 114, 116 and the jacket 112 may be overcome by pulling or peeling (e.g., "banana" peeling) the top of the jacket 148 off of the bottom 150, as shown in FIG. 3. The tear features 122, 142 may facilitate separation of the top and bottom portions 148, 150 of the jacket 112 by weakening the lateral walls 134 of the cavity 136.

In contemplated embodiments, the strength members 114, 116 and the jacket 112 may not be tightly bonded to one another, further easing the access process. For example, the materials of the strength members 114, 116 (e.g., glass-reinforced plastic) and the jacket 112 (e.g., polyethylene) may be incompatible (polar/non-polar). Instead of using bond-enhancing additives, such as ethylene acrylic acid copolymer coated on the strength members 114, 116, to improve the bond and prevent water penetration; in some embodiments water blocking yarn 152 may be wrapped (e.g., helically, counter-helically) around the strength members 114, 116 to prevent water penetration between the strength members 114, 116 and the jacket 112 material, as disclosed in U.S. Application No. 61/594,723, filed Feb. 3, 2012, which is incorporated by reference herein in its entirety. Use of the water blocking yarn 152 may require less peel force for separation of the jacket 112 and strength members 114, 116 when compared to other embodiments where the jacket 112 and strength member 114, 116 are bonded to one another. In contemplated embodiments, this technique of including yarn 152 wrapped around the strength members 114, 116 in conjunction with tear features 122, 142 (e.g., material discontinuities) to improve ease of access to optical fibers may be used in fiber optic cables that do not include armor, and/or also in fiber optic cables other than flat cables.

According to present embodiments, one or more tear features 122, 142 in the cable jacket 112 can be configured to provide relatively easy access to optical fibers of the cavity 136, where the ease of access may be at least partly quantified by the force required to pull, or peel away a section (e.g., top 148) of the cable jacket 112 via the one or more tear features 122, 142. The peel force may be measured as a direct-force measurement, in newtons (N), of the force required to peel or tear open the jacket 112. It is understood that the jacket 112 and associated peel force will not be perfectly uniform and that a person or machine cannot exert a perfectly uniform force as the jacket 112 is peeled, so peel forces described in this Application indicate an average force exerted as a distance (e.g., a meter) of the jacket section being peeled back.

According to present embodiments, peel forces can be relatively small when compared to the corresponding forces required to access a cable without extruded discontinuities of materials (i.e., tear features 122, 142) in the jacket 112. For example, once the side portions 144, 146 have been removed from the cable 110 of FIG. 1, as described above and shown in FIGS. 2-3, the peel force required to peel open the jacket 112 may be less than about 100 N. In exemplary embodiments, the peel force required may be from about 10 N to about 50 N; and in yet further exemplary embodiments may be from about 20 N to about 40 N. Peel forces may be defined herein to include any force great enough to cause the jacket material to rip, tear, or otherwise separate along the tear features 122, 124 for accessing optical fibers of the cavity 136. Such peel force values may also apply to the other cables disclosed herein.

According to one testing procedure to measure peel force, following removal of the side sections 144, 146, about 25 mm of jacket 112 is separated along the lateral sides 134 of the cavity on one end of the cable 110. The ends of the cable 110 are secured to a bench or other sturdy surface. A small hole is placed in the top 148 of the jacket 112 proximal to the edge of the jacket 112 where the jacket 112 was separated along the lateral sides 134, and one end of a hook is inserted into the hole in the jacket 112. A lanyard is attached to the other end of the hook. The lanyard is fixed to a force gauge, such as a CHATILLON® gauge available from Ametek Test and Calibration Instruments of Largo, Fla. The force gauge is pulled by hand or by some mechanical means, away from the cable 110 at an angle, until the top 148 of the jacket 112, attached to the hook, peels away from the bottom 150 of the jacket 112. The angle is selected to and/or adjusted provide the maximum shear force to the tear (such as about 45-degrees). The top 148 of the jacket 112 is pulled for a distance of one-meter away from the initial jacket removal location. The average peel can be calculated as the average force measured by the force gauge as the top 148 of the jacket 112 is pulled along the selected distance.

Referring to FIG. 4, a fiber optic cable 210 includes features similar to the fiber optic cable 110 as shown in FIG. 1, such as a jacket 224 forming a cavity 222 and enclosing strength members 214, 216 and armor 218, 220. Optical fibers 212 in loose tubes 226 are positioned in the cavity 222. Guide markings 228 (e.g., notches, painted lines, co-extruded material) on the periphery of the exterior 230 and extending along the length of the fiber optic cable 210 denote lines 232, 234 through the jacket 224 designating where to shave (e.g., cut, tear) the jacket 224 in order to reach the strength members 214, 216 and avoid the armor 218, 220. Such markings 228 may generally guide cutting or shaving to reach, avoid, or otherwise utilize internal features of the cable 210, such as embedded tear features 236.

As may well be apparent to one of skill in the art, one or more of such guides markings 228 may also be used on the exterior of other embodiments disclosed herein. Furthermore, in contemplated embodiments, this technique of including guide markings 228 in conjunction with embedded features, such as tear features 122, 142, 236 (e.g., material discontinuities), to improve ease of access to optical fibers may be used in fiber optic cables that do not include armor, and/or also in fiber optic cables that are not flat cables.

Referring to FIG. 5, a fiber optic cable 310 includes features similar to the fiber optic cable 110 as shown in FIG. 1, such as a jacket 312 forming a cavity 322 and enclosing strength members 314, 316 and armor 318, 320. The fiber optic cable 310 further includes a third strength member 324 and includes a second cavity 326. The cavities 322, 326 each tightly contain tight-buffered optical fibers 328, 330. According to an exemplary embodiment, the armor 318, 320 includes two flat sheets of corrugated steel or another material, where the three strength members 314, 316, 324 in combination with the armor 318, 320 provide crush resistance to protect the optical fibers 328, 330. Embedded tear features 332 are positioned in the jacket 312 between the strength members 314, 316, 324 and the respective cavities 322, 324 so that once side portions of the fiber optic cable 310 are shaved (see generally FIGS. 2 and 4), an operator may tear the top off of the cable 310 via the tear features 332 to access the optical fibers 328, 330. Similar cables may include more strength members and optical fibers, or may only include two strength members on either side of a cavity that is tightly containing a tight-buffered optical fiber.

Referring now to FIGS. 6A-6B, a fiber optic cable 410 includes features similar to the fiber optic cable 110 as shown in FIG. 1, such as a jacket 412 enclosing strength members 414, 416 and armor 418, and forming a cavity 420 supporting optical fibers 422 in a buffer tube 430. In some embodiments, the armor 418 includes a flexible, cloth-like material, such as a wire mesh or woven Kevlar fibers, that may fold around the strength member 414, 416 and be extruded around by the jacket 412. Alternatively, two or more pieces of the armor 418 may be used. A pathway including a series of internally-embedded tear features 428 (e.g., more than one) extends around the armor 418 to facilitate access to the optical fibers 422.

According to an exemplary embodiment, a guide marking 424, in the form of a co-extruded patch of a different color, identifies the location of an embedded rip cord 426. To access the optical fibers 422 of the fiber optic cable 410, an operator cuts the jacket 412 proximate to the guide feature 424 to access the rip cord 426. The operator then pulls the rip cord 426 to form a lengthwise cut along the exterior of the jacket of the fiber optical cable 410. As shown in FIG. 6B, once the rip cord 426 has been accessed and pulled, the separation of the exterior of the jacket 412 provides a flap 432 (e.g., extension, flange, gripping point) that may be gripped by the operator. In some embodiments, the flap is at least 2 mm in height from the interior base to the tip. The operator then pulls the flap 432 outward and downward with sufficient peel force (e.g., less than 100 N distributed over 10 cm cable length) to open the fiber optic cable 410 along the pathway of embedded tear features 428.

Figure 7:
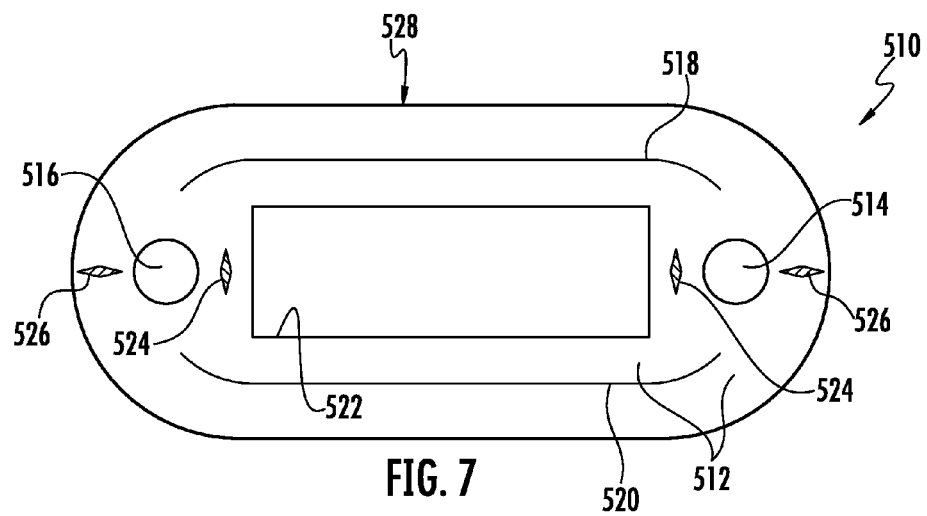
FIGS. 7-9 are sectional views of fiber optic cables according to still other exemplary embodiments.

Referring to FIG. 7, a fiber optic cable 510 includes features similar to the fiber optic cable 110 as shown in FIG. 1, such as a jacket 512 forming a cavity 522 and enclosing strength members 514, 516 and armor 518, 520. The fiber optic cable includes first and second tear features 524, 526 (e.g., inner and outer embedded tear features), which are on the same side of the cavity 522 as one another. According to an exemplary embodiment, the first tear feature 524 is located interior to the exterior 528 (e.g., outside surface, periphery) of the fiber optic cable 510 and beneath the armor 518. The second tear feature 526 is located closer to the exterior 528 than the first tear feature 524. A second set of first and second tear features 526, 528 is symmetrically arranged on the opposite side of the cavity 522 in some embodiments.

According to an exemplary embodiment, the first and second tear features 524, 526 are formed from the second polymeric material, which is co-extrudable with the first polymeric material, as discussed above, and the first and second tear features 524, 526 are integrated into the jacket 512 such that the first and second tear features 524, 526 both form discontinuities of material within the jacket 512. At least one of the second polymeric material and the interface between the first and second polymeric materials yields at a lesser tearing force than the first polymeric material, such that the tear features 524, 526 facilitate opening the jacket 512 around the armor 518, 520 to access the cavity 522 by way of tearing through the jacket 512 via the tear features 524, 526.

Positioning the second tear feature 526 in the portion of the jacket 512 located outside of the armor 518, such as on an opposite side of the strength member 514 from the first tear feature 524, may reduce or remove a need to shave the jacket 512 to the strength member 514 prior to opening the fiber optic cable 510. Instead, both the jacket 512 interior to and exterior to the strength member 514 is configured to tear when the top of the fiber optic cable 510 is pull or peeled upward with sufficient peel force.

Figure 8:
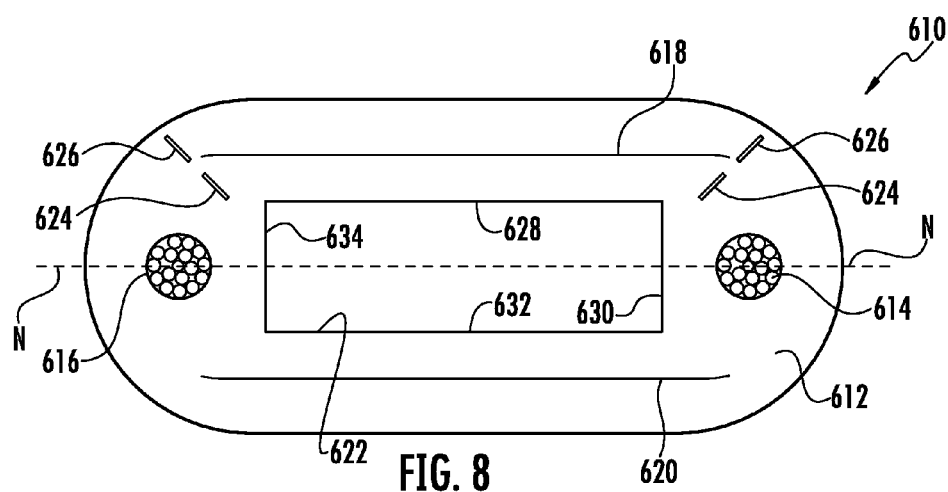

Referring to FIG. 8, a fiber optic cable 610 includes features similar to the fiber optic cable 110 as shown in FIG. 1, such as a jacket 612 forming a cavity 622 and enclosing strength members 614, 616 and armor 618, 620. Similar to the fiber optic cable 510 as shown in FIG. 7, the fiber optic cable 610 includes first and second tear features 624, 626, which are on the same side of the cavity 622 as one another. The armor 618, 620 includes flat sheets, such as flat sheets of corrugated steel, and the strength members 614, 616 include stranded steel cords. The cavity 622 is sized to receive a stack of ribbonized optical fibers (e.g., 6 or 12 ribbons stack of 6- or 12-fiber ribbons).

According to an exemplary embodiment, the first and second tear features 624, 626 are positioned fully in the top half of the cable cross-section, proximate to the ends of the armor 618, 620. Put another way, the tear feature 624, 626 in the jacket 612—one tear feature 624 in the inner cavity wall and the other tear features 626 outside of the armor 618, 620—are offset from the neutral axis N of the cable 610 and positioned so that only the top 628 of the cavity 622 separates when the cable 610 is opened, thereby leaving three of the walls 630, 632, 634 of the cavity 622 intact. The three intact walls 630, 632, 634 provide a trough or channel to support and contain optical fibers of the fiber optic cable 610.

Figure 9:
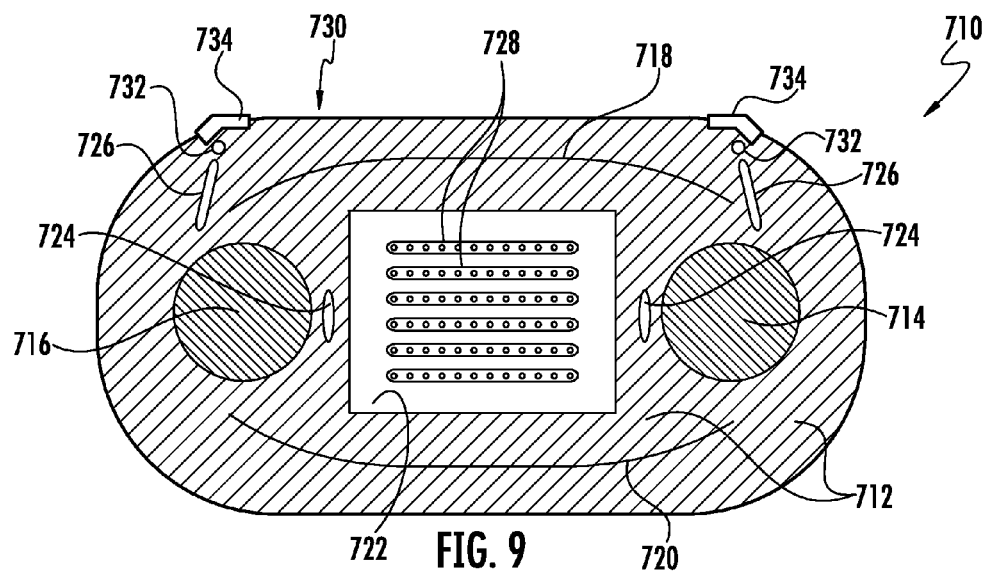

Referring now to FIG. 9, a fiber optic cable 710 includes features similar to the fiber optic cable 110 as shown in FIG.

1, such as a jacket 712 enclosing strength members 714, 716 and armor 718, 720, and forming a cavity 722 supporting a stack of fiber optic ribbons 728. The exterior 730 of the cable 710 includes a guide marking 734 denoting the presence of an embedded rip cord 732 within the jacket 712. Similar to the fiber optic cable 510 as shown in FIG. 7, the fiber optic cable 710 includes first and second tear features 724, 726, which are on the same side of the cavity 722 as one another.

According to an exemplary embodiment, the tear features 724, 726 of the cable 710 are not linearly aligned with one another. Instead the path for accessing the cavity 722, provided at least in part by the tear features 724, 726, extends in multiple directions (e.g., at least a 30-degree change of direction; a right angle), which is intended to prevent inadvertent opening of the fiber optic cable 710. Furthermore, locating the rip cord 732, which initiates the opening process, within the jacket 712 is further intended to prevent inadvertent opening of the fiber optic cable 710.

Figure 10:
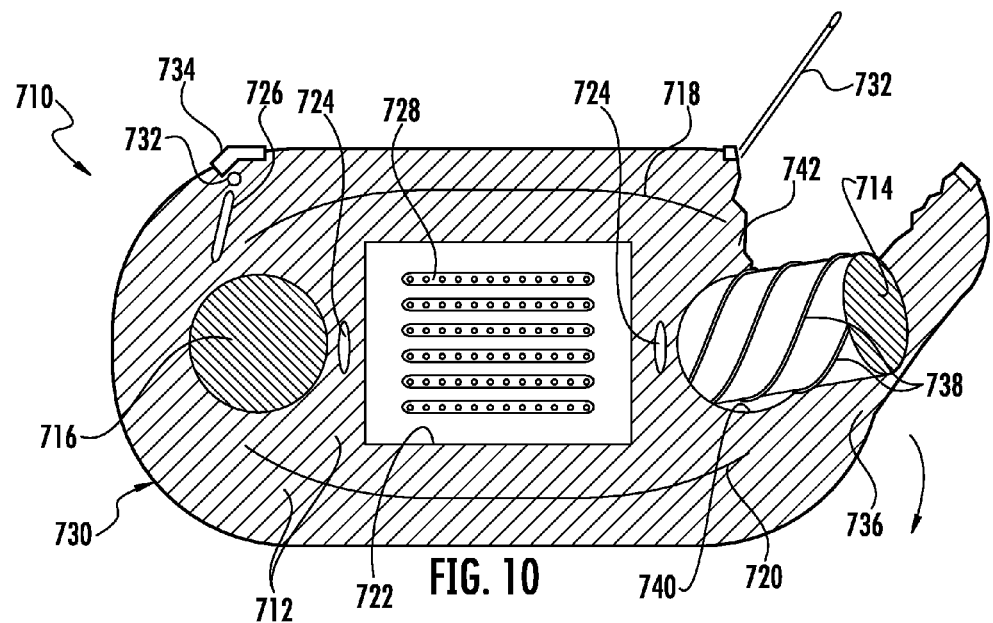
FIGS. 10-12 are conceptual diagrams showing steps for accessing the cavity of the fiber optic cable of FIG. 9 by tearing an outer portion of the jacket, tearing interior portions of the jacket, and peeling the top off of the jacket.

Referring to FIG. 10, accessing and pulling the rip cord 732 provides a flap 736 that allows for tearing of the jacket 712 through the first tear 726 feature to access the strength member 714 (see also flap 432 as shown in FIG. 6B). In some embodiments, the strength member 714 is wrapped with a water-swellable yarn 738 to provide water blocking between the strength member 714 and the jacket 712 (when the cable 710 is unopened) without fully or tightly bonding the strength member 714 and jacket 712 together so that the strength member 714 may be easily removed during the process of accessing the cavity 722.

Figure 11:
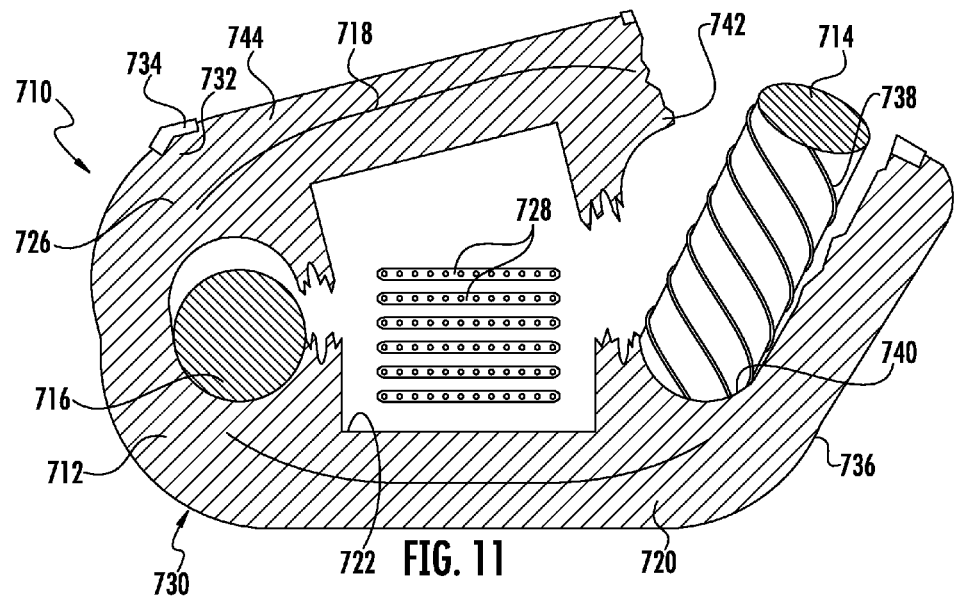

Referring to FIG. 11, once the strength member 714 is reached, the operator pulls out the strength member 714 and pulls apart the open area 740 (e.g., strength member cavity), which is then absent the strength member 714. The edge 742 of the armor 718 extends laterally above the open area 740 such that the armor edge 742 provides a gripping point for tearing the top 744 off of the rest of the cable 710 to access the optical fiber ribbons 728 in the cavity 722. Pulling apart the open area 740 with sufficient peel force tears through the second strength member 724, providing lateral access to the cavity 722 of the fiber optic cable 710.

Figure 12:
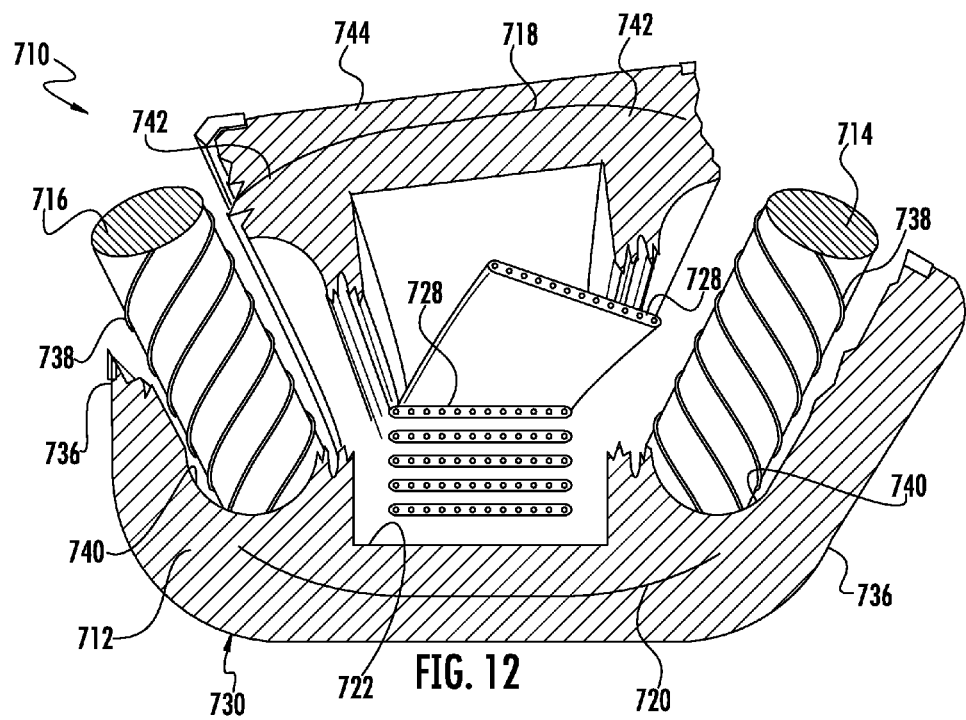

Referring to FIG. 12, continued pulling apart of the jacket 712 tears the tear features 724, 726 on the other side of the cavity 722 to fully open the fiber optic cable 710. Ribbons 728 or other contents of the fiber optic cable 710 may then be accessed for splicing, connectorization, or other reasons. Once access is no longer needed, the ribbons 728 may be returned to the cavity 722 and the top portion 744 of the jacket 712 may be returned to the original position atop the rest of the cable 710. Tape, an overmold (e.g., polyurethane), an attachable housing, a clamp, or another structure may then be added to hold the top portion 744 of the fiber optic cable 710 closed and sealed.

The teachings and disclosure provided herein may also be used in conjunction with the manufacturing and assembly of fiber optic cable assemblies, such as with the attachment of a flat tether cable or furcation tube to a distribution or interconnect cable. Examples of cable assemblies incorporating flat cables are provided in U.S. application Ser. No. 12/843,402. According to an exemplary embodiment, in addition to the steps of attaching a tether to a distribution cable, the manufacturing of such an assembly further includes accessing the optical fibers of the distribution cable or tether according to the processes disclosed herein, such as including accessing the cavity around the armor using the access features disclosed herein.

The construction and arrangements of the armored fiber optic cable and access features, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fiber optic cable, comprising:
    a jacket primarily formed from a first polymeric material and having an outer surface defining an exterior of the fiber optic cable, wherein the exterior of the fiber optic cable has an oblong-shaped periphery with two opposing longer sides and two opposing shorter sides, wherein the jacket further forms lateral walls of an interior cavity extending lengthwise through the fiber optic cable, wherein the cavity is configured to support an optical fiber;
    first and second strength members, each surrounded laterally by the jacket such that the lateral walls of the cavity and the cavity itself separate the first and second strength members from one another;
    armor extending lengthwise along the fiber optic cable above the cavity and at least partially above the first and second strength members, wherein the armor has greater tensile strength than the first polymeric material and thereby forms a barrier limiting inadvertent penetration of the jacket; and
    a tear feature located interior to the exterior of the fiber optic cable and beneath the armor, wherein the tear feature is formed from a second polymeric material that is co-extrudable with the first polymeric material, wherein the tear feature is integrated into the jacket such that the tear feature forms a discontinuity of material within the jacket, and wherein at least one of the second polymeric material and the interface between the first and second polymeric materials yields at a lesser tearing force than the first polymeric material, whereby the tear feature facilitates opening the jacket around the armor to access the cavity by way of tearing through the jacket via the tear feature.

2. The fiber optic cable of claim 1, wherein the tear feature extends through one of the lateral walls of the cavity.

3. The fiber optic cable of claim 1, wherein the tear feature has the cavity on one side, one of the first and second strength members on another side, the armor on a third side.

4. The fiber optic cable of claim 1, wherein the tear feature is aligned with the narrowest portion of the lateral wall of the cavity.

5. The fiber optic cable of claim 1, wherein the tear feature is a first tear feature and the fiber optic cable further comprises a second tear feature located on the opposite side of the cavity to the first tear feature, whereby the first and second tear features together facilitate complete separation of the cavity into two parts.

6. The fiber optic cable of claim 1, wherein the tear feature includes a geometric discontinuity in the transverse cross-section of the tear feature.

7. The fiber optic cable of claim 6, wherein the tear feature is diamond shaped and the geometric discontinuity is a vertex of the diamond.

8. The fiber optic cable of claim 1, wherein the second polymeric material is dyed a different color than the first polymeric material.

9. The fiber optic cable of claim 1, wherein the second polymeric material comprises polypropylene.

10. The fiber optic cable of claim 9, wherein the second polymeric material further comprises the first polymeric material mixed with the polypropylene.

11. The fiber optic cable of claim 10, wherein the first and second strength members are each glass-reinforced plastic rods, wherein the armor includes a layer of woven aramid yarns embedded in the jacket, and wherein the first polymeric material comprises polyethylene.

12. A fiber optic cable, comprising:
a jacket primarily formed from a first polymeric material and having an outer surface defining an exterior of the fiber optic cable, wherein the exterior of the fiber optic cable has an oblong-shaped periphery with two opposing longer sides and two opposing shorter sides, wherein the jacket further forms lateral walls of an interior cavity extending lengthwise through the fiber optic cable, wherein the cavity is configured to support an optical fiber;
first and second strength members, each surrounded laterally by the jacket such that the lateral walls of the cavity and the cavity itself separate the first and second strength members from one another;
armor extending lengthwise along the fiber optic cable above the cavity and at least partially above the first and second strength members, wherein the armor has greater tensile strength than the first polymeric material and thereby forms a barrier limiting inadvertent penetration of the jacket; and
a first tear feature located interior to the exterior of the fiber optic cable and beneath the armor,
a second tear feature closer to the exterior than the first tear feature, wherein the first and second tear features are formed from a second polymeric material that is co-extrudable with the first polymeric material, wherein the first and second tear features are integrated into the jacket such that the first and second tear features form discontinuities of material within the jacket, wherein at least one of the second polymeric material and the interface between the first and second polymeric materials yields at a lesser tearing force than the first polymeric material, whereby the tear features facilitate opening the jacket around the armor to access the cavity by way of tearing through the jacket via the tear features.

13. The fiber optic cable of claim 12, wherein at least a portion of the second tear feature is not beneath the armor.

14. The fiber optic cable of claim 13, wherein the first and second tear features are on opposite sides of one of the first and second strength members.

15. The fiber optic cable of claim 14, wherein the first and second tear features are located closer to one of the longer sides of the exterior than the other.

16. The fiber optic cable of claim 15, wherein the first and second tear features have different cross-sectional geometries from one another with regard to at least one of size, shape, and orientation.

* * * * *